Figure 1:
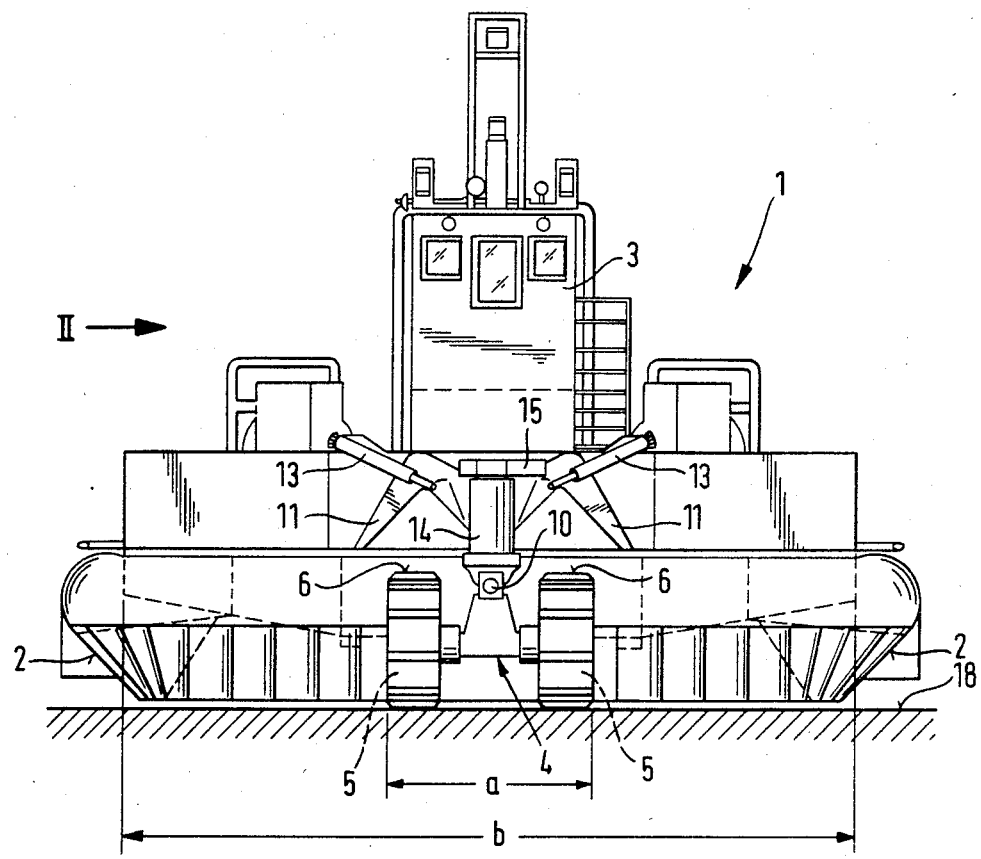

United States Patent [19]

Korppoo et al.

[11] Patent Number: 4,591,015

[45] Date of Patent: May 27, 1986

[54] WHEEL PROPULSION DEVICE FOR AIR CUSHION VEHICLE

[75] Inventors: Seppo Korppoo, Espoo; Martin Landtman, Helsinki, both of Finland

[73] Assignee: Oy Wärtsilä AB, Helsinki, Finland

[21] Appl. No.: 540,989

[22] Filed: Oct. 12, 1983

[30] Foreign Application Priority Data

Oct. 19, 1982 [FI] Finland .................................. 823576

[51] Int. Cl.⁴ .............................................. B60V 1/14
[52] U.S. Cl. .................. 180/119; 114/67 A; 440/90; 440/92
[58] Field of Search ............... 180/119, 117, 116, 124, 180/127, 128, 6.48; 440/90, 91, 92; 114/67 A, 270

[56] References Cited

U.S. PATENT DOCUMENTS

| 655,742 | 8/1900 | Sheen | 440/90 X |
|---|---|---|---|
| 3,207,245 | 9/1965 | Weiland | 180/119 |
| 3,306,250 | 2/1967 | Pitchford | 114/270 |
| 3,548,967 | 12/1970 | Bertin | 180/117 |
| 4,029,165 | 6/1977 | Miller et al. | 180/6.48 |
| 4,063,611 | 12/1977 | Anderson | 180/119 |
| 4,473,358 | 9/1984 | Viosca, Jr. | 440/90 X |

FOREIGN PATENT DOCUMENTS

| 931658 | 11/1947 | France | 440/90 |
|---|---|---|---|
| 8202107 | 12/1983 | Netherlands | 114/270 |

Primary Examiner—John J. Love
Assistant Examiner—Mitchell J. Hill
Attorney, Agent, or Firm—Dellett, Smith-Hill and Bedell

[57] ABSTRACT

A self-propelled air cushion vehicle includes a traction wheel device comprising at least two separate traction wheel units. Each traction wheel unit includes at least two consecutive wheels surrounded by a common caterpillar track, preferably two such wheel pairs arranged side by side. The traction wheel units are arranged in the longitudinal direction of the vehicle, one at the fore end of the vehicle and the other at the rear end of the vehicle, both at the central longitudinal axis of the vehicle.

13 Claims, 3 Drawing Figures

WHEEL PROPULSION DEVICE FOR AIR CUSHION VEHICLE

The invention relates to a self-propelled air cushion vehicle comprising at least two traction wheel units.

Wheel propulsion in air cushion vehicles is known per se. A known design uses wheel propulsion devices attached at both sides of the vehicle body. A caterpillar track or belt is applied around the wheels and the whole device has a considerable length in the longitudinal direction of the vehicle, which makes the vehicle rather heavy. Despite the considerable length of the caterpillar track, the construction does not effectively stabilize the air cushion vehicle, because the vehicle is supported close to its natural transverse swinging axis. Attempts have been made to improve the stability of the vehicle by arranging wheel propulsion devices at every corner of a generally rectangular vehicle body. This again so much increases the total weight of the vehicle and its propulsion and support arrangement, that the use of a caterpillar track has been abandoned, but then the propulsion effect of the wheels is very low, especially when the air cushion vehicle moves on soft ground, for instance, on snow or swamp.

The object of the invention is to solve the wheel propulsion problems of an air cushion vehicle by arranging the traction wheels in a new way as stated in claim 1. By arranging traction wheels to form traction wheel units comprising preferably two side by side arranged wheel pairs, each formed by two consecutive wheels surrounded by a caterpillar track, the traction unit is made broad enough to be located on the central longitudinal axis of the air cushion vehicle, and still give the air cushion vehicle sufficient stability. Regardless of whether the traction wheel unit comprises four or two wheels, it should preferably be so dimensioned, that the distance between the outermost side surfaces of the wheels of one unit is at least 25% of the width of the body of the air cushion vehicle.

A traction wheel unit according to the invention needs only one support beam or the like, which is of advantage, because the weight of a wheel unit support device is considerable. In a preferred embodiment of the invention, both traction wheel units are attached by means of a universal joint to a support device supported at the body of the vehicle. This means that each traction wheel unit is turnable in any direction. Such an universal joint attachment is easily made by journalling the wheel unit on two rotation shafts perpendicular to each other.

At least the one traction wheel unit should comprise a steering device, by means of which the traction direction of the wheel unit can be altered relative to the longitudinal axis of the vehicle. The steering device is preferably so made, that the wheel unit is attached to a substantially vertical shaft, which is rotatably journalled in the support device of the wheel unit. Suitable control of the rotational movement of this shaft can be obtained by known means. Most suitable for this purpose is usually a hydraulic rotation device. It is preferred to use a rotation device having a turning angle of considerably more than 180°. The motion direction of the caterpillar tracks of the wheel unit can then be changed without changing the traction direction of the wheel unit simply by rotating the wheel unit half a turn, which is desirable in the case that the caterpillar tracks have different traction properties in opposite rotation directions. For instance, a caterpillar track may be designed to be used in one direction on hard ground and in the opposite direction, in water or on soft ground. A caterpillar track having different properties in opposite directions is easily made by providing the track with foldable traction wings, which fall down on the track in one rotation direction and, in the other rotation direction, extend perpendicularly to the plane of the track.

In an air cushion vehicle moving on difficult ground, the wheel units should be so arranged that their vertical position relative to the body of the vehicle is adjustable. This is obtained by having the support device of the traction wheel unit swingably journalled at the body of the vehicle, and by using hydraulic cylinders for determining the angular position of the support device relative to the body of the vehicle. By making the members determining the vertical position of the wheel devices powerful enough, they can be used in the manner of a jack to lift the vehicle when it is necessary, for instance, to repair the skirt of the vehicle.

In air cushion vehicles according to the invention, hydraulic motors may be used in the wheel units for driving the wheels. The hydraulic motors of each separate wheel unit should then have its own hydraulic power system. Then the wheel units can be rotated at different speeds, which is important, for instance, when the air cushion vehicle moves from water to land and the front wheel unit operates on hard ground, whereas the rear wheel unit operates in water.

Figure 2:
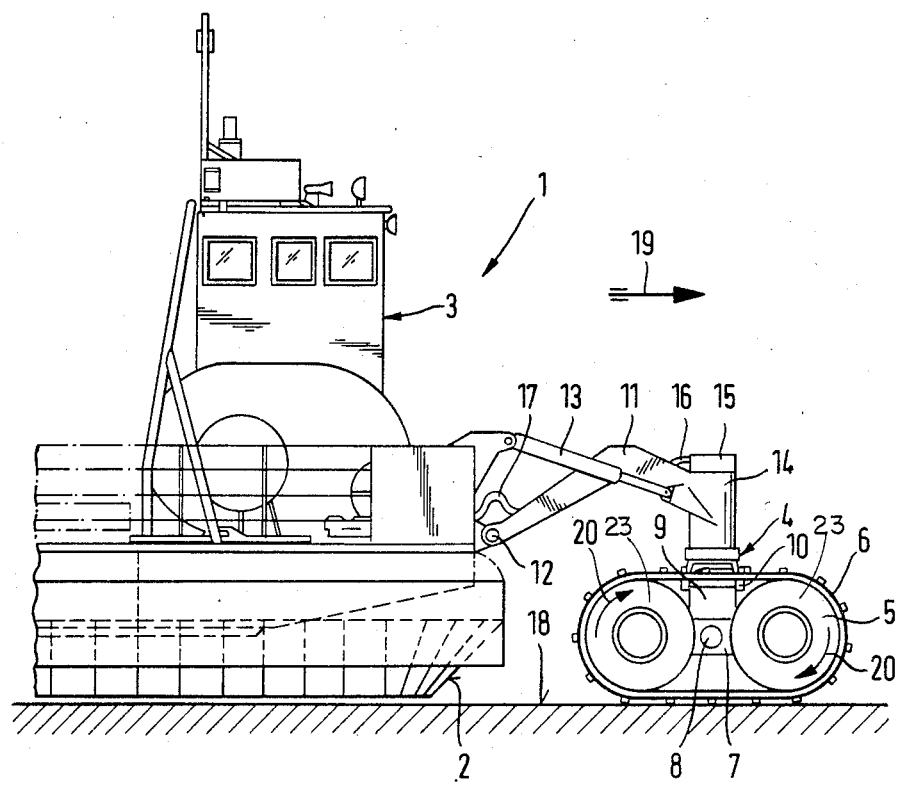
Figure 3:
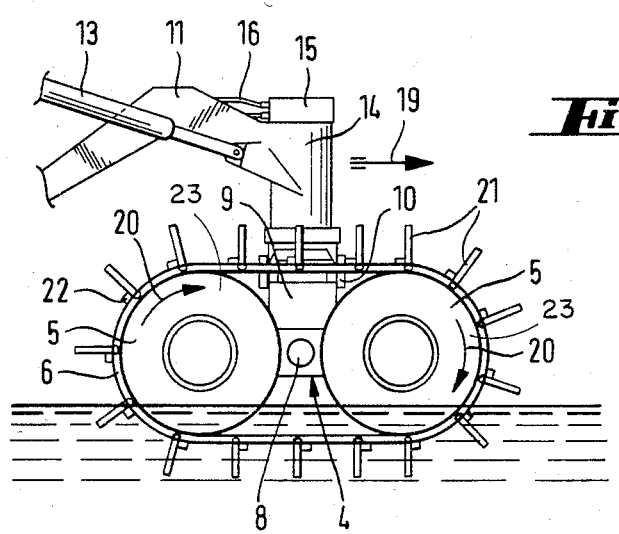

The invention will now be described in greater detail, by way of example, with reference to the accompanying drawing, in which FIG. 1 is a front view of an air cushion vehicle according to the invention, FIG. 2 is a side view of the fore end of the air cushion vehicle of FIG. 1, FIG. 3 is a side view of a traction wheel unit operating in water.

In the drawing, 1 refers to the body of an air cushion vehicle and 2 to a flexible skirt arranged to enclose the air cushion of the vehicle. There is a cockpit 3 in the fore end of the vehicle and directly in front of the cockpit there is a traction wheel unit 4. There is another traction wheel unit at the corresponding place at the opposite end of the vehicle. The construction of the wheel unit is best seen in FIG. 2.

In the illustrated embodiment, the wheel unit comprises four wheels 5, which are of the conventional pneumatic rubber tyre type used in road vehicles. Two wheels arranged one after another form a wheel pair, which is surrounded by a caterpillar track 6. The track may be of the kind commonly used in forestry tractors, but a variety of special tracks can also be used. Wheels 5 of the wheel unit are journalled in a support 7, which is rotatably journalled on a horizontal, transverse shaft 8 in a body member 9, which in turn is rotatably journalled on a horizontal shaft 10 extending in the longitudinal direction of the wheel unit. Shafts 8 and 10 are preferably perpendicular to each other and, because of this, the traction wheel unit may turn in any direction, that is, its attachment is an universal joint attachment.

The traction wheel unit is attached to a support member 11, which is swingably journalled on a horizontal shaft 12 at the body of the air cushion vehicle. Further, attached to support member 11 are hydraulic cylinders 13, by means of which the angular position of the support member can be altered, which has an influence on the vertical position of the associated traction wheel unit. At the outer end of support member 11, there is a mainly vertical steering body 14 comprising a vertical shaft attached to the wheel unit. This shaft is connected at least in one of the air cushion vehicle support members to a steering device 15, which is hydraulically operated and receives power via hydraulic hoses 16 and 17. Wheels 5 are also hydraulically driven, by motor 23, and pressurized hydraulic fluid is supplied to motors 23 also via hoses 17. When the air cushion vehicle moves on hard ground 18, the vertical position of the traction wheel units is adjusted by power cylinders 13 so, that the height of the air cushion vehicle relative to the ground 18 is suitable and, at the same time, the vertical support force of the wheel units directed towards the ground, is high enough to give necessary traction power for the propulsion of the air cushion vehicle. By applying pressure regulation methods known per se, the desired contact pressure between the traction members and the ground can be automatically maintained at a proper value.

It is clear from FIG. 1 that the distance a between the outer edges of the caterpillar tracks located side by side in a wheel unit, exceeds 25% of the width b of the air cushion vehicle body.

FIG. 3 discloses how a wheel unit according to the invention operates in water. The motion direction of the air cushion vehicle is shown by an arrow 19 and the rotation direction of wheels 5 by arrows 20. Caterpillar track 6 includes foldable wings 21, which provide good propulsion power in water. Wings 21 fold in one direction only and this means that by turning the wheel unit 180° by means of steering device 15, and by changing the rotation of the wheels to the opposite direction, the track operates with wings 21 folded down to the track plane. Then the track operates well on hard ground. A track of this kind is useful when the air cushion vehicle has to be used in water, on swamp or snow as well as on relatively hard ground. The folding of wings 21 can be arranged by hinge means or also by making the wings of rubber or the like, so that they fold due to the elasticity of the material. Freely foldable wings must have, at their one side, a support, as shown by 22 in FIG. 3.

The traction wheel unit may be provided with a working level or the like for maintenance work, for instance to facilitate the replacement of the caterpillar track in difficult terrain. The wheel unit may also be provided with splash guards and other necessary auxiliary means.

The invention is not limited to the embodiments described, but several modifications thereof are feasible within the scope of the attached claims.

We claim:

1. A self-propelled air cushion vehicle comprising a rigid body structure having a front end and a rear end and defining a longitudinal axis of the vehicle, a flexible skirt attached to the body structure and enclosing a space to contain an air cushion for at least partially supporting the rigid body structure, two traction wheel units, and first and second universal joints connecting the traction wheel units respectively to the rigid body structure outside said flexible skirt, one traction wheel unit being in front of the front end of the rigid body structure and the other behind the rear end thereof, at positions in the region of said longitudinal axis, each of said wheel units comprising at least two consecutive wheels and at least one common, ground-engaging caterpillar track surrounding said wheels, and the vehicle further comprising drive means connected to the traction wheel units for driving the caterpillar tracks to propel the vehicle, and steering means for varying the angular position of at least one of said wheel units relative to said longitudinal axis.

2. Air cushion vehicle according to claim 1, comprising means for adjusting the vertical position of at least one of said traction wheel units relative to the body of the vehicle.

3. Air cushion vehicle according to claim 2, comprising means for adjusting the vertical position of each of said traction wheel units.

4. Air cushion vehicle according to claim 1, wherein at least one of said caterpillar tracks comprises means operable in a first mode for propulsion of the vehicle on land and in a second mode for propulsion of the vehicle in water.

5. Air cushion vehicle according to claim 1, wherein each traction wheel unit comprises a hydraulic motor coupled drivingly to the wheels of said wheel unit, and the vehicle comprises means for delivering fluid under pressure to said hydraulic motor.

6. Air cusion vehicle according to claim 1, wherein the drive means are operable selectively to drive at least one of the caterpillar tracks in two opposite directions and said one caterpillar track includes means for affording said one caterpillar track different traction properties when it is driven in said two opposite directions respectively.

7. Air cushion vehicle according to claim 6, wherein said one caterpillar track comprises an endless belt member and wing elements that are secured to the belt member in such a manner as to be foldable relative to the belt member between a first position in which they lie generally flat against the belt member and a second position in which they project away from the belt member, so that in one direction of movement of the track the wing elements tend to assume said one position and in the other direction of movement of the track the wing elements tend to assume said second position.

8. Air cushion vehicle according to claim 1, wherein the drive means are operable selectively to drive at least one of the caterpillar tracks in two opposite directions relative to the wheel unit of said one caterpillar track, and said one caterpillar track comprises means operable when the track is driven in one of said two directions for propulsion of the vehicle on land and when the track is driven in the other of said two directions for propulsion of the vehicle in water.

9. Air cushion vehicle according to claim 8, wherein the wheel unit of said one caterpillar track is turnable through an angle of 180 degrees, whereby upon reversing the drive direction of said one track relative to its wheel unit, the drive direction of said one track relative to the rigid body structure remains unchanged.

10. Air cushion vehicle according to claim 1, wherein each traction wheel unit comprises two pairs of consecutive wheels arranged side by side.

11. Air cushion vehicle according to claim 1, wherein each caterpillar track has two opposite side edges, and the distance between the outermost track side edges of each wheel unit is at least 25% of the width of said rigid body structure.

12. Air cushion vehicle according to claim 1, wherein said steering means comprise a steering device included in said one traction wheel unit.

13. Air cushion vehicle according to claim 12, wherein the turning range of said steering device considerably exceeds 180 degrees.

* * * * *